United States Patent [19]
Lausenhammer et al.

[11] Patent Number: 6,048,476
[45] Date of Patent: Apr. 11, 2000

[54] CLAMP PRESSURE OPTIMIZATION SYSTEM AND METHOD

[75] Inventors: Manfred Lausenhammer, Herrenberg, Germany; Christopher Choi, Richmond Hill, Canada

[73] Assignee: Husky Injection Molding Systems Ltd., Canada

[21] Appl. No.: 09/039,637

[22] Filed: Mar. 16, 1998

[51] Int. Cl.[7] .................................................. B29C 45/82
[52] U.S. Cl. ........................ 264/40.5; 264/40.5; 425/149; 425/150; 425/589
[58] Field of Search ................................ 264/40.1, 40.5, 264/328.1; 425/135, 149, 150, 155, 156, 589, 590, 595, 145

[56] References Cited

U.S. PATENT DOCUMENTS

| | | | |
|---|---|---|---|
| 3,939,329 | 2/1976 | Doran | 425/149 |
| 4,131,596 | 12/1978 | Allen . | |
| 4,767,300 | 8/1988 | Buja et al. . | |
| 4,917,840 | 4/1990 | Harada et al. . | |
| 4,942,004 | 7/1990 | Catanzaro | 264/40.5 |
| 5,441,680 | 8/1995 | Guergov . | |
| 5,540,577 | 7/1996 | Ishikawa et al. . | |
| 5,682,813 | 11/1997 | Brewer et al. . | |
| 5,844,391 | 12/1998 | Hiroaka . | |

FOREIGN PATENT DOCUMENTS

| | | |
|---|---|---|
| 0130769 | 4/1988 | European Pat. Off. . |

*Primary Examiner*—Jill L. Heitbrink
*Attorney, Agent, or Firm*—Bachman & LaPointe, P.C.

[57] ABSTRACT

The present invention relates to a method and a system for preventing mold flash. The method broadly comprises the steps of: introducing a fluid under pressure into a mechanism for applying a clamping force such as the clamping cylinder of a piston-cylinder unit; increasing the pressure of the fluid in the clamping force applying mechanism so as to apply a clamping force to the mold; injecting moldable material into the mold; measuring actual pressure in the clamping force applying mechanism; and determining whether the mold is close to blowing open when the moldable material is injected into the mold using the actual measured pressure in the clamping cylinder. The method further comprises providing an injection unit having an injection cylinder; supplying fluid under pressure to the injection cylinder; measuring the actual injection pressure of the fluid in the injection cylinder; and determining whether the actual injection pressure is below the pressure needed to blow the mold open under existing clamp conditions. The system of the present invention includes a pressure sensor for measuring the actual pressure within the clamping force application mechanism and a controller provided with logic for determining whether the mold is close to blowing open when the moldable material is injected into the mold using the measured actual clamp pressure.

24 Claims, 3 Drawing Sheets

CLAMP PRESSURE OPTIMIZATION SYSTEM AND METHOD

BACKGROUND OF THE INVENTION

The present invention relates to a method and a system for preventing a mold from being blown open and creating flash during injection.

The injection pressure of plastic inside an injection mold acting on the projected area of its molding surfaces constitutes a force trying to blow open the mold. The force exerted by the injection molding machine's clamp counters this force and prevents the mold from blowing open if it is greater than the plastic pressure force. If the clamp force is insufficient, the mold is forced open by the greater plastic pressure and the plastic "flashes" or leaks out of the mold, resulting in a defective part. Repeated operation of the mold in a flashing condition can cause permanent damage to the mold as flashed plastic trapped between the mold's parting surfaces is hobbed into the steel causing permanent deformation of the steel.

The clamping force used by an injection molding machine to hold a mold closed is typically generated by using hydraulic oil pressure. Increasing the clamping force requires increased oil pressure and/or flow, each of which consumes more energy. Clearly, it is desirable to minimize the clamp force used, to conserve energy, while providing sufficient clamp force to prevent flashing, to prevent mold damage, and to prevent the production of bad parts.

A number of attempts have been made to address the problem of flash damage. One such attempt is shown in U.S. Pat. No. 4,131,596 to Allen. In the '596 patent, an apparatus and a method for providing a signal that measures the extent of the separation of injection mold dies during the injection of the plastic material into the mold cavity is illustrated. The apparatus and the method use the signal produced by a position sensor to reduce the possibility of flash damage to the mold dies by decreasing the pressure clamping the molds together if the separation exceeds a value that is known to cause flash. The apparatus and the method also use the signal to alter the rate of injection of the plastic material. In a similar fashion, U.S. Pat. No. 5,540,577 to Ishikawa uses a position sensor to measure platen (mold) separation during injection and uses a signal generated by the position sensor to adjust the clamp force to maintain a preselected platen (mold) separation.

U.S. Pat. No. 4,767,300 to Buja illustrates a molding machine having a position sensor for measuring the separation of the mold elements resulting from the introduction of the plastic material into the mold cavity. When a predetermined separation of the mold elements is detected, the injection pressure is reduced to a lower hold pressure.

Where mold or platen separation is measured and used as a control signal, the results are unsatisfactory because separation must occur before responsive action is taken. In order to have a system which avoids the aforementioned problems of flashing, mold damage, and the production of defective parts, one needs to have a system that avoids separation of the mold elements. Thus, it follows that no matter how fast a response can be provided the fact that separation must occur before any response can be initiated makes such a system inherently less effective.

U.S. Pat. No. 4,917,840 to Harada illustrates an injection-compression molding method in which a pressure sensor measures clamp pressure and uses the signal to control the compression of the melt in the partially closed mold after injection. Similarly, European Patent No. 0 130 769 to Shouichi illustrates injection-compression molding in which pressure sensors in the mold cavity are used to control clamp and injection pressures. The objects of these methods however is not to prevent mold flashing during injection, but rather to control the compression of the melt inside a partially closed mold.

U.S. Pat. No. 5,682,813 to Brewer illustrates a shutheight control in a vertical press using hydraulic pressure applied to a chamber in the clamp assembly. Such a system could not be easily adapted to solve the need for an automatic clamp optimization system.

U.S. Pat. No. 5,441,680 to Guergov illustrates using a pre-pressure mold cavity to control the injection rate of the plastic material entering it. This system requires a sealing system at the mold's parting line and a source of pressurized fluid to pre-pressurize the mold. The application and the cost of this approach is considerably limited if an attempt was made to use it as a universal method of controlling mold flashing in all molding applications.

SUMMARY OF THE INVENTION

Accordingly, it is an object of the present invention to provide an improved system and method for preventing mold flashing.

It is a further object of the present invention to provide a system and a method as above which automatically optimizes the clamp pressure to an acceptable minimal level.

It is yet a further object of the present invention to provide a system and a method as above which minimizes the energy consumed in generating high pressure oil for clamping.

It is yet a further object of the present invention to provide a system and a method as above which optimizes the injection pressure for a given clamping force.

The foregoing objects are attained by the system and the method of the present invention.

In accordance with the present invention, the method for preventing mold flashing in an injection molding machine having a mold formed by two mold halves broadly comprises the steps of: providing means for applying a clamping force to said mold; introducing a fluid under pressure into said clamping force applying means for applying a clamping force to the mold; injecting moldable material into the mold; measuring actual pressure in the clamping force applying means; and determining whether the mold is close to blowing open when the moldable material is injected into the mold using the actual measured pressure in the clamping force applying means. The method further comprises the steps of providing an injection unit having an injection cylinder; supplying fluid under pressure to the injection cylinder; measuring the actual injection pressure of the fluid in the injection cylinder; and determining whether the actual injection pressure is below the pressure needed to blow the mold open under existing clamp conditions.

The system of the present invention may be used with an injection molding machine having a mold formed by two mold halves and means for applying a clamping force to the mold, such as a piston-cylinder unit. The system broadly comprises: means for introducing a fluid under pressure into said clamping force applying means; means for injecting moldable material into the mold; means for measuring the actual pressure within the clamping force applying means; and means for determining whether the mold is close to blowing open when the moldable material is injected into the mold using the measured actual clamp pressure. The moldable material injection means comprises an injection unit having an injection cylinder. The system further comprises means for supplying fluid under pressure to the injection cylinder, means for measuring the actual injection pressure of the fluid in the injection cylinder, and means for determining whether the actual injection pressure is below the pressure needed to blow the mold open under existing clamping conditions.

Other details of the system and the method of the present invention, as well as other objects and advantages attendant thereto, are set forth in the following detailed description and the accompanying drawings in which like reference numerals depict like elements.

DETAILED DESCRIPTION OF THE PREFERRED EMBODIMENT(S)

Figure 1:
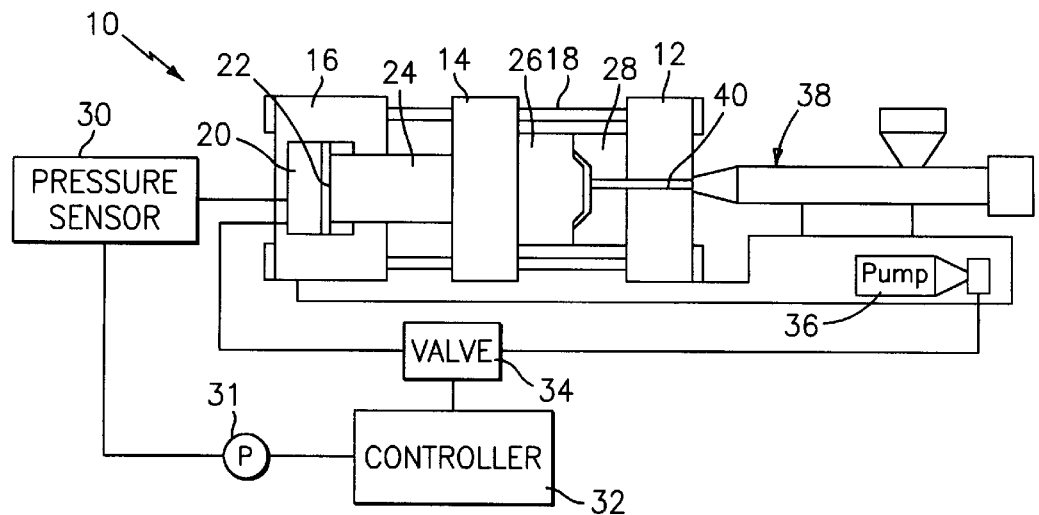
FIG. 1 is a schematic representation of an injection molding machine clamp circuit.

Referring now to the drawings, FIG. 1 shows a hydraulic clamp circuit for an injection molding machine 10. The machine 10 includes a stationary platen 12, a movable platen 14 and a clamp block 16. Tiebars 18, typically four of them, connect the stationary platen 12 to the clamp block 16 and provide guidance for the movable platen 14. The clamp block 16 includes a piston-cylinder unit for applying a clamp force to the mold. The unit includes an internal clamping cylinder 20 and a reciprocating piston 22 within the cylinder 20. The piston 22 has a column 24 attached to it, which column 24 is bolted to one side of the movable platen 14. Mold halves 28 and 26 are mounted respectively to stationary platen 12 and movable platen 14 such that when movable platen 14 is moved to the left by applying oil pressure to the column side of the piston 22 or by alternate cylinders (not shown), the mold is opened. When the mold is in the closed position, as shown in FIG. 1, high pressure oil directed to the clamping cylinder 20 causes the mold to be clamped between the platens 12 and 14.

The cylinder 20 and piston 22 may be used as the mechanism for moving the mold halves 26 and 28 between mold closed and mold open positions. If desired, however, the cylinder 20 and piston 22 may be used solely as the mechanism for applying a clamping force and other means, such as stroke cylinders (not shown), may be used to move the mold halves between mold open and closed positions.

A pressure sensor 30 is provided to measure the actual hydraulic pressure or "clamp pressure" in the clamp cylinder 20 and to transmit a signal representative of the measured actual pressure to a controller 32. If desired, a pressure gauge 31 may be provided to provide a readout of the actual clamp pressure in the clamp cylinder 20. The controller 32 is designed to send command signals to a valve 34 to control the oil supply from a pump 36 and thereby control the pressure of the oil in the clamping cylinder 20.

The machine 10 also includes an injection unit 38 for injecting a moldable material into the mold. The injection unit 38 may be a conventional reciprocating screw plasticizer and injection piston such that when sufficient material, such as a plastic resin, has been melted, it is injected into the mold via sprue 40. The pressure of the moldable material within the mold acting on the projected area of the molding surfaces constitutes a force trying to blow open the mold. The force exerted by the clamping cylinder 20, acting through the column 24, counters the force generated by the moldable material pressure and prevents the mold from blowing open, provided that it is greater than the moldable material pressure force.

Figure 3:
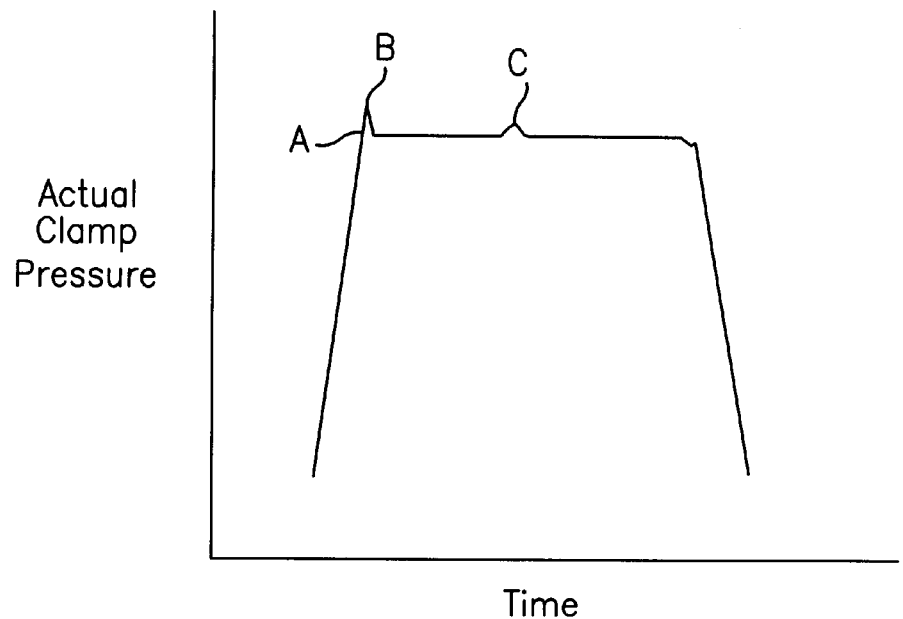
FIG. 3 is a graphical representation of a typical pressure profile in the clamp cylinder.

FIG. 3 shows a typical pressure profile of the oil pressure in the clamping cylinder 20. The operator determines a set point pressure A and an allowable overshoot pressure B for the clamping cylinder 20 using the controller 32. As the oil pressure increases immediately after the mold has been closed, the pressure tends to overshoot the set point pressure A by an allowable amount B and then stabilize at the set point pressure. As the moldable material is injected at high pressure into the mold, a spike C is measured indicating the effect of the moldable material pressure force on the piston 22. Normally, this spike is very small and in many cases unmeasurable, if an excessive amount of clamp force is present. However, if a marginal clamp force is present the spike may temporarily cause the mold to "breathe" slightly. That is the mold does not "blow" open and flash, but rather continues to contain the injected moldable material without flash while it and the clamp assembly "flexes" under the brief impact force of the injected moldable material, indicated by the spike C.

Figure 4:
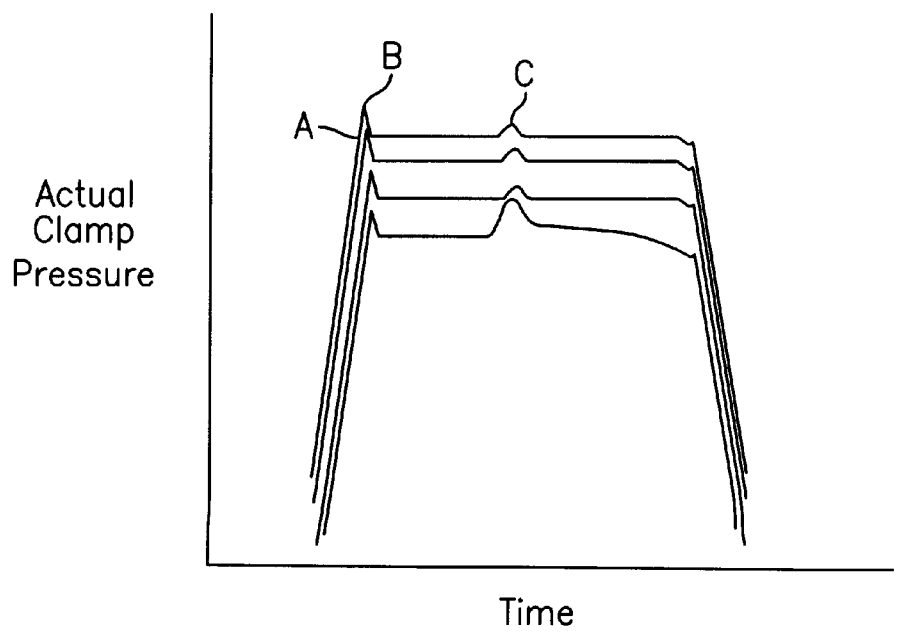
FIG. 4 is a graphical representation of successive pressure profiles in the clamp cylinder as the set point pressure is reduced until the clamp "blows" open.
Figure 5:
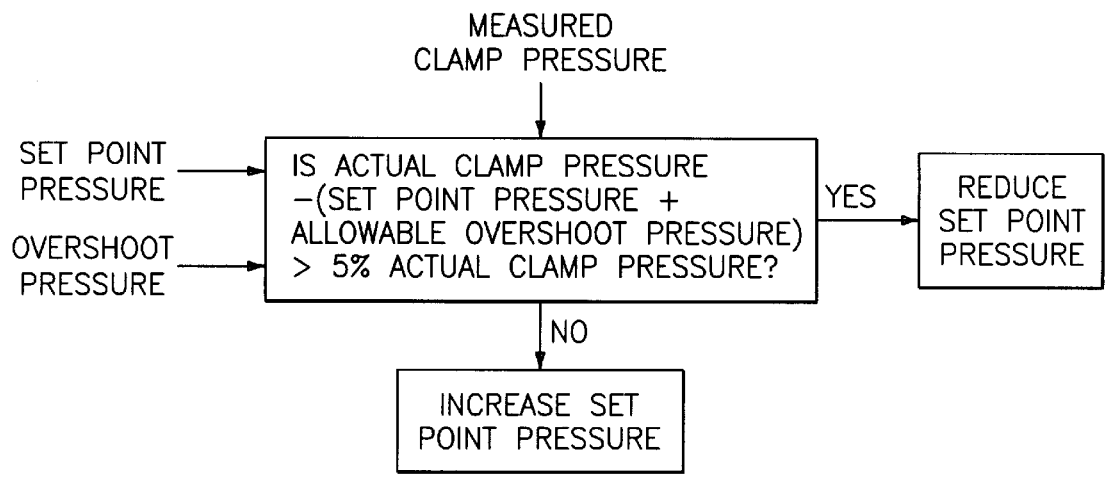
FIG. 5 is a flow chart showing a first portion of the logic used by the controller in the system of the present invention.

As previously discussed, the pressure sensor 30 measures the actual clamp pressure in the clamping cylinder 20 and transmits a signal representative of the actual clamp pressure to the controller 32. The controller 32 is designed to use a particular logic when determining the output signal it will send to the valve 34 to regulate the clamping pressure in the clamping cylinder 20. The logic for preventing mold flash using the measured actual clamp pressure is illustrated in the flow chart of FIG. 5. It may be described as follows: (a) is the actual clamp pressure – (set point pressure + overshoot allowance pressure) > 5% of the actual clamp pressure; (b) if yes to (a), the operator, or the machine's central system automatically reduces the set point pressure by a prescribed amount, such as 5%; and (c) allow conditions to stabilize for a number of cycles, such as 5 cycles, before measuring again. If the result of logic step (a) is less than 5% of the actual clamp pressure, it means the clamp is close to allowing the mold to blow open and the set point pressure needs to be changed to a higher setting. Thus, the actual clamp pressure used is between 5 to 10% of the pressure actually needed to prevent the mold blowing open under the present injection conditions. FIG. 4 illustrates the reduction of clamp pressure until mold blowing is detected. In the event that the operator alters the injection conditions, for example raises the injection pressure, the controller 32, using the foregoing logic, automatically detects and adjusts the clamp pressure to accommodate the injection pressure change. Thus, the clamp pressure used by the system of the present invention is automatically optimized to an acceptable minimum level, thereby minimizing wear on the mold and machine and minimizing the energy consumed in generating high pressure oil for clamping.

Figure 2:
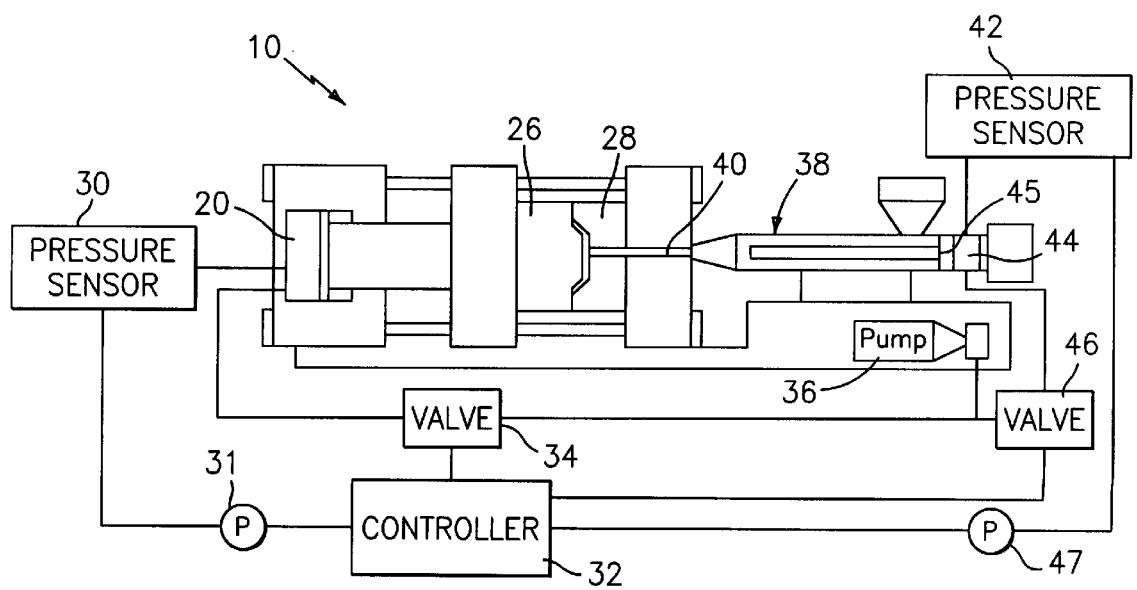
FIG. 2 is a schematic representation of an injection molding machine clamp and injection circuits.

A second embodiment of the present invention is shown in FIG. 2. Referring to that figure, the components of the injection molding machine 10 are identical to the components in the machine of FIG. 1. In this embodiment however, a pressure sensor 42 is provided for measuring the hydraulic oil pressure in the injection cylinder 44, in which a piston 45 reciprocally moves. Additionally, an injection control valve 46 that responds to control signals from the controller 32 is provided. The control valve 46 controls the oil flow from the pump 36 to the injection cylinder 44. The machine further includes, if desired, a pressure gauge 47 so that an operator has a visual readout of the actual injection pressure in the injection cylinder 44.

Figure 6:
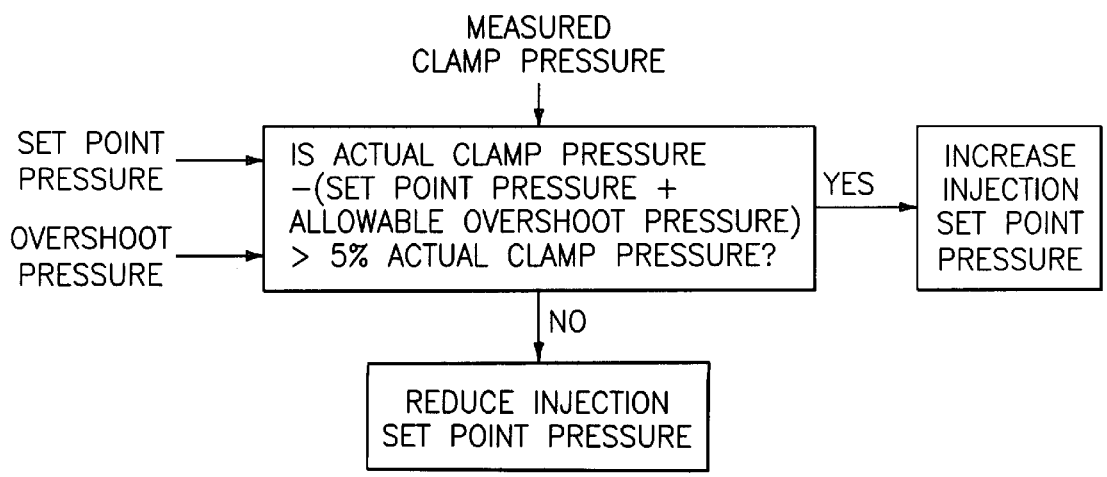
FIG. 6 is a flow chart showing a second portion of the logic used by the controller in the system of the present invention.

Because the initial setting of the injection pressure by the operator may not be the optimum, it is possible to use the above described clamp pressure control system to optimize the injection pressure. Instead of lowering the clamp pressure until it is optimized for a prescribed injection pressure, the injection pressure can be raised or lowered for a prescribed clamp pressure. Thus, for a given present clamp pressure, the injection pressure can be automatically raised in increments until the clamp pressure sensor 20 indicates the mold is blowing open. The controller 32 uses the logic shown in FIG. 6 to determine the output signal it will send to the injection unit control valve 46. The logic may be described as follows: (a) is actual clamp pressure – (set point pressure + overshoot allowance pressure) > 5% of actual clamp pressure; (b) if the answer to (a) is yes, then increase the set point injection pressure by a prescribed amount, such as 5%; and (c) then allow conditions to stabilize for 5 cycles before measuring again. If the result of logic step (a) is less than 5% of the actual clamp pressure, it means the clamp is close to allowing the mold to blow open and the injection set point is changed to a lower setting. Using this logic, the actual injection pressure used is between 5% to 10% of the pressure below the pressure actually needed to blow mold open under the present clamping conditions. Thus, injection pressure is optimized for a given clamp force.

The logic used by the controller 32 to control the valves 34 and 46 may be implemented in any desired manner. For example, the controller 32 may include a computer which uses a software program to implement the aforementioned logic. Alternatively, the controller 32 may include an electronic circuit which implements the aforementioned logic.

In operation, the mold halves 26 and 28 are moved from an open position to a closed position by introducing fluid under pressure into the clamping cylinder 20 and/or by other means (not shown) such as stroke cylinders. The pressure of the fluid being introduced into the clamping cylinder 20 is increased to a desired set point pressure for applying a desired clamping force to the mold. Thereafter, a moldable material is injected into the mold via the injection unit 38 and the sprue 40. The actual clamp pressure within the clamping cylinder 20 is measured by the pressure sensor 30. A signal representative of the actual clamp pressure is transmitted to the controller 32. The controller then determines whether the mold is close to blowing open using the measured actual clamp pressure and the logic shown in FIG. 5. If the controller determines that the actual clamp pressure less the set point pressure and the overshoot allowance pressure is greater than 5% of the actual clamp pressure, the set point pressure is reduced by the operator by a prescribed amount. If the controller determines that the actual clamp pressure less the set point pressure and the overshoot allowance pressure is less than 5% of the actual clamp pressure, the set point pressure is increased by the operator. After the operator has made the adjustment to the set point pressure, the system is allowed to operate for five cycles. The measurement of the actual clamp pressure is then repeated.

Where it is desired to optimize the injection pressure of the moldable material for a given clamping condition, the actual injection pressure of the fluid in the injection cylinder 44 is measured by the pressure sensor 42. A signal representative of the measured actual injection pressure is transmitted to the controller 32 which using the logic shown in FIG. 6 determines whether the actual injection pressure is below the pressure needed to blow the mold open under existing clamping conditions. If the controller determines that the actual clamp pressure in the clamping cylinder 20 less the set point pressure and the allowable overshoot pressure is less than 5% of the actual clamp pressure, the injection pressure in the injection cylinder 44 is lowered using valve 46 and pump 36. If the controller determines that the actual clamp pressure in the clamping cylinder 20 less the set point pressure and the allowable overshoot pressure is greater than 5% of the actual clamp pressure the injection pressure is increased. After the operator has adjusted the injection pressure in the injection cylinder 44 in this manner, the machine 10 is operated for five cycles and the measurements are repeated.

As can be seen from the foregoing discussion, the system and the method of the present invention using the aforementioned logic allow the use of a minimally acceptable clamp pressure to hold the mold close during injection of the moldable material and thereby substantially prevent mold flashing and the manufacture of defective parts. Additionally, the system and method of the present invention allow the energy consumed in generating the high pressure oil for clamping to be minimized. Still further, the system and the method of the present invention allow the operator to optimize the injection pressure for a given clamping force.

While the system and the method of the present invention has been described in the context of an injection molding machine having a single mold, it should be recognized that the system and the method could be implemented on injection molding machines having multiple molds.

While it has been described that the pressure in the clamping cylinder and the injection cylinder may be increased or decreased by adding or withdrawing fluid, it is also possible to increase or decrease the pressure in one or both of these cylinders without adding or withdrawing fluid. For example, the pressure in one or both of these cylinders may be increased or decreased merely by changing the operating condition of the pump via a controller (not shown) to increase or decrease pressure without any flow alteration.

It is apparent that there has been provided in accordance with the present invention a clamp pressure optimization system and method which fully satisfy the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for preventing mold flashing in an injection molding machine having a mold formed by two mold halves, said method comprising the steps of:

providing means for applying a clamping force to said mold;

introducing a fluid under pressure into said clamping force applying means;

increasing the pressure of said fluid in said clamping force applying means so as to apply a clamping force to said mold;

injecting moldable material into said mold;

measuring the actual pressure in said clamping force applying means;

determining whether said mold is close to blowing open when said moldable material is injected into said mold using said measured actual pressure and a set point pressure of said clamping force applying means; and adjusting said set point pressure in response to said determining step.

2. The method of claim 1 further comprising:

said pressure increasing step comprising increasing the pressure within the clamping force applying means to a first set point pressure and allowing said pressure to increase to an overshoot allowance pressure and then return to said first set point pressure;

transmitting a signal representative of said actual clamp pressure to a controller; and said determining step comprising determining whether the actual clamp pressure less the first set point pressure and the overshoot allowance pressure is greater than a certain percentage of the actual clamp pressure.

3. The method of claim 2 further comprising:

said adjusting step comprising reducing the first set point pressure by a prescribed amount if the actual clamp pressure less the first set point pressure plus the overshoot allowance pressure is greater than said certain percentage of the actual clamp pressure.

4. The method of claim 2 further comprising:

said adjusting step comprising increasing the first set point pressure if the actual clamp pressure less the first set point pressure plus the overshoot pressure is less than said certain percentage of the actual clamp pressure.

5. The method of claim 4 wherein said first set point increasing step comprises increasing the first set point to a previous value.

6. The method of claim 2 wherein said certain percentage is 5%.

7. The method of claim 1 further comprising the steps of:

said injecting step comprising providing an injection unit having an injection cylinder;

supplying a fluid under pressure to said injection cylinder;

measuring the actual injection pressure of said fluid in said injection cylinder; and determining whether the actual injection pressure is below the pressure needed to blow the mold open under existing clamping conditions.

8. The method of claim 7 wherein said determining step comprises:

transmitting a signal representative of the actual clamp pressure in said clamping force applying means to a controller; and determining whether the actual clamp pressure in the clamping force applying means less a first set point pressure and an overshoot allowance pressure is greater than a certain percentage of said actual clamp pressure in the clamping force applying means.

9. The method of claim 8 further comprising lowering the injection pressure in said injection cylinder if said actual clamp pressure in the clamping force applying means less the first set point pressure and the overshoot allowance is less than said certain percentage.

10. The method of claim 9 wherein said lowering step comprises sending a second signal from said controller to a second control valve for causing fluid in said injection cylinder to be withdrawn.

11. The method of claim 8 further comprising increasing the injection pressure in said injection cylinder if said actual clamp pressure in the clamping force applying means less said first set point pressure and said overshoot allowance pressure is greater than said certain percentage.

12. The method of claim 11 wherein said increasing step comprises transmitting a second signal from said controller to a second valve which causes the flow of fluid to said injection cylinder to increase.

13. The method of claim 1 wherein:

said fluid introducing step comprises introducing a fluid under pressure into a clamping cylinder of a piston-cylinder unit for applying said clamping force;

said increasing step comprises increasing the pressure of said fluid in said clamping cylinder; and said measuring step comprises measuring the actual pressure in said cylinder.

14. A method according to claim 1, further comprising:

remeasuring the actual pressure in said clamping force applying means;

determining whether said mold is close to blowing open when said moldable material is injected into said mold using said remeasured actual pressure; and readjusting the set point pressure in response to said determining step using said remeasured actual pressure.

15. In an injection molding machine having a mold formed by two mold halves and a means for applying a clamping force to said mold, a system for preventing mold flashing comprising:

means for introducing a fluid under pressure into said clamping force applying means so as to apply a clamping force to said mold;

means for injecting moldable material into said mold;

means for measuring the actual clamp pressure within said clamping force applying means;

means for determining whether said mold is close to blowing open when said moldable material is injected into said mold using said measured actual clamp pressure and a set point pressure of said clamping force applying means; and said determining means including means for adjusting said set point pressure.

16. The system of claim 15 further comprising:

said introducing means comprising means for increasing the pressure within the clamping force applying means to a desired set point pressure and for allowing said pressure to increase to an overshoot allowance pressure and then return to said desired set point pressure;

said means for measuring the actual pressure within said clamping force applying means comprising a first sensor;

said determining means comprising a controller;

said first pressure sensor transmitting a signal representative of said actual clamp pressure to said controller; and said controller having means for determining whether the actual clamp pressure less the desired set point pressure and the overshoot allowance pressure is greater than a certain percentage of the actual clamp pressure.

17. The system of claim 16 wherein said adjusting means comprises:

a first valve for controlling the amount of fluid in said clamping force applying means; and said controller sending an output signal to said first valve.

18. The system of claim 16 further comprising:

means for reducing the desired set point pressure by a prescribed amount if the measured actual clamp pressure less the desired set point pressure plus the overshoot allowance pressure is greater than said certain percentage.

19. The system of claim 16 further comprising:

means for increasing the desired set point pressure if the measured actual clamp pressure less the desired set point pressure plus the overshoot pressure is less than said certain percentage.

20. The system of claim 16 further comprising:

said means for injecting moldable material into said mold comprising an injection unit having an injection cylinder;

means for supplying a fluid under pressure to said injection cylinder;

means for measuring the actual injection pressure of said fluid in said injection cylinder; and means for determining whether the actual injection pressure is below the pressure needed to blow the mold open under existing clamping conditions.

21. The system of claim 20 further comprising:

means for transmitting the measured actual injection pressure to said controller.

22. The system of claim 21 wherein said adjusting means further comprises:

means for increasing or lowering the pressure in said injection cylinder in response to said controller determining if the measured actual clamp pressure in said clamping force applying means less the desired set point pressure and the overshoot allowance pressure is less than or greater than a certain percentage of the measured actual clamp pressure in said clamping force applying means.

23. The system of claim 22 further comprising:

said means for increasing or lowering the pressure in said injection cylinder comprising a second valve; and said controller transmitting a control signal to said second valve to increase or lower the pressure in said injection cylinder.

24. The system of claim 15 wherein:

said clamping force applying means comprises a piston-cylinder unit having a clamping cylinder;

said means for introducing fluid comprises means for introducing a fluid into said clamping cylinder; and said measuring means measures the actual clamp pressure within said cylinder.

* * * * *